Dec. 1, 1970   R. P. DE LEU   3,544,179
COMBINATION THRUST AND RADIAL BEARING
Filed Oct. 21, 1968   2 Sheets-Sheet 1

INVENTOR.
ROBERT P. DE LEU
BY Hobbs & Green
ATTORNEYS

United States Patent Office 3,544,179
Patented Dec. 1, 1970

3,544,179
COMBINATION THRUST AND RADIAL BEARING
Robert P. De Leu, South Bend, Ind., assignor to Reliance Electric and Engineering Company, Euclid, Ohio, a corporation of Ohio
Filed Oct. 21, 1968, Ser. No. 769,153
Int. Cl. F16c 1/24
U.S. Cl. 308—168    13 Claims

ABSTRACT OF THE DISCLOSURE

A combination thrust and radial bearing structure for a shaft with an annular collar, including a body with a cylindrical bore therethrough and an annular groove therein separating the bore into two radial bearing sections. The groove is defined by annular side walls which form opposed thrust bearings for the shaft collar, and the thrust bearings are provided with radial recesses for receiving lubricant from the radial bearings. The body may be enclosed in a housing containing a reservoir which supplies oil to the two radial bearings, which in turn supply oil to the thrust bearings.

---

In standard construction of hydrodynamic sleeve bearings, the thrust carrying members are located at the ends of the sleeves and the thrust bearing surfaces are lubricated by the flow of lubricant from the ends of the sleeve bearings onto the surfaces of the thrust bearings. Conventional bearing structures normally utilize two thrust collars mounted on and connected to the shaft on either side of the sleeve bearing, either inside or outside a bearing housing. In this type of construction, the thrust bearings are radial surfaces on the collars and on the adjacent ends of the sleeve bearings, and seepage of lubricant from the sleeve bearings onto and between the two radial surfaces provides the required lubrication for the bearings. However, the lubricant passing through the radial load becomes relatively hot from the viscous shear effect in the lubricant and hence is at an elevated temperature when it reaches the radial surfaces of the thrust bearings, thus frequently providing ineffective lubrication in the thrust bearings. Further, in some installations, the space available for the bearings is limited and inadequate for standard bearings using thrust collars at the ends of the sleeve bearing and is too confined for proper and convenient servicing of the bearings. It is therefore one of the principal objects of the invention to provide a combination thrust and radial bearing structure which eliminates the foregoing thrust collars and utilizes thrust bearings, which is effectively lubricated with lubricant at normal temperatures, and which is substantially more compact than the bearing installation employing conventional thrust collars.

Another object of the invention is to provide an integral thrust and sleeve bearing structure which has high thrust capacities, and which includes a self-contained lubricating system not dependent solely on lubricant flow developed by radial pressures.

Still another object of the invention is to provide a compact, relatively simple thrust and radial bearing structure which can readily be assembled during the installation of the equipment on which it is used, and which will adjust itself effectively to variations in shaft alignment adversely affecting the life of the bearing structure or the operation of the lubricating system.

A further object is to provide a bearing structure of the aforementioned type in which the thrust bearing is completely enclosed and continually lubricated and protected from foreign substances, and which maintains an oil supply at the thrust bearing surfaces over prolonged periods of machine idleness and supplies an effective amount of lubricant to the thrust bearing surfaces initially on starting and thereafter throughout the operation of the bearing structure.

Additional objects and advantages of the present invention will become apparent from the following description and accompanying drawings, wherein.

Figure 1:
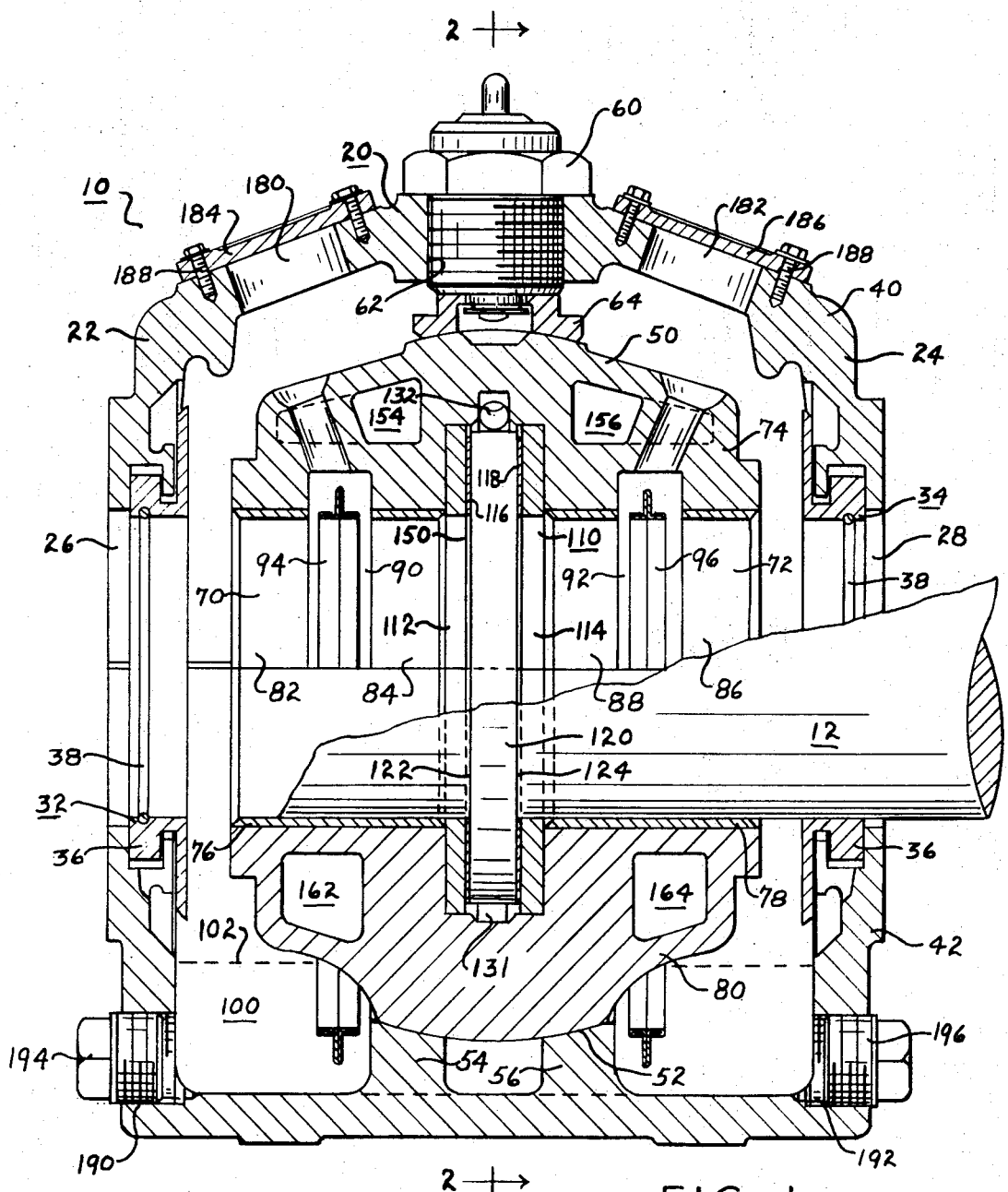
FIG. 1 is an axial cross sectional view of the present combination thrust and radial bearing structure, showing a fragmentary view of a shaft journalled in the bearing.

Referring more specifically to the drawings, numeral 10 designates generally the present combination radial and thrust bearing, 12 a shaft of a machine on power driven equipment, such as a blower or fan used in relatively high temperature operations, such as in conjunction with the operation of furnaces, heat treating ovens and the like. The bearing is designed primarily for use under such adverse high temperature conditions; however, the concept of the present invention is not limited to installations of that type, but is suitable for a variety of different applications and types of installations in which the operating conditions may vary over wide ranges.

The bearing structure illustrated in the drawings includes a housing 20 having side walls 22 and 24 containing shaft openings 26 and 28, respectively. Shaft 12 normally extends completely through both openings 26 and 28 and projects from the housing in both directions, and is sealed at the openings by seals 32 and 34, respectively, the seals shown consisting of an annular metal member 36 and O-ring 38, seating in an annular groove in member 36 and engaging the periphery of shaft 12. Various types of sealing structures may be used as long as the structure effectively prevents any substantial seepage from the housing along the shaft.

Housing 20 consists of an upper section indicated generally by numeral 40 and a lower section indicated generally by numeral 42, secured together by a plurality of bolts (not shown) extending downwardly through the upper section and being threadedly received in the holes in the lower section. Mounted in the housing and spaced from the internal wall thereof is a liner or body 50 seated on a spherical seat 52 on bosses 54 and 56 formed on the internal wall of lower section 42. The liner, which is also formed of an upper and lower section, is generally annular in shape and is held rigidly on its spherical seat by plunger assembly 60 threadedly received in a hole 62 in the top of section 40. The plunger seats on an annular bushing 64 which in turn seats on the top of the liner, and upon tightening of the plunger assembly in the threaded hole, urges the liner firmly on its seat 52.

The radial bearings are contained in liner 50 and consist of two sleeves 70 and 72 of babbitt or other suitable anti-friction material in the upper section of the liner and sleeves 76 and 78 in the lower half 80 of the liner. The two sleeves 70 and 72 are formed in two parts 82 and 84, and 86 and 88, respectively, and the parts of each sleeve are separated from one another to provide openings 90 and 92 between the two sections of the two sleeves. The two openings extend outwardly through the wall of the liner, and oil rings 94 and 96 are inserted therein and, when shaft 12 is journalled in the sleeves, the rings rest on the upper surface of the shaft and extend down into reservoir 100 in the lower part of housing section 42, the level of the oil being normally maintained at approximately line 102. With the rings in this position, rotation of the shaft causes the rings to likewise rotate, generally relatively slowly, carrying oil from reservoir 100 upwardly onto the surface of the shaft where it flows laterally into the radial bearing parts of sleeves 70 and 72 and downwardly onto sleeves 76 and 78.

The present bearing structure includes a thrust bearing assembly generally indicated by numeral 110 disposed between sleeves 70 and 76 on one side of the liner and sleeves 72 and 78 on the other side of the liner. The thrust bearing assembly consists of rings 112 and 114 having thrust plates 116 and 118, respectively, on their inwardly facing surfaces. The two thrust plates are made of a suitable anti-friction bearing material such as babbitt or bronze. The shaft 12 contains a collar 120, either formed integrally with the shaft or rigidly secured thereto by any suitable means, and this collar includes bearing surfaces 122 and 124 for engaging thrust plates 116 and 118, respectively, and thereby transmitting the thrust forces of the shaft to either of the two thrust plates and thence through rings 112 and 114 to liner 50.

Figure 3:
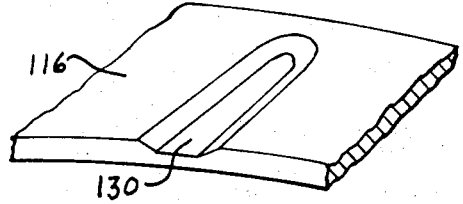
FIG. 3 is a fragmentary perspective view of one of the thrust bearings.
Figure 2:
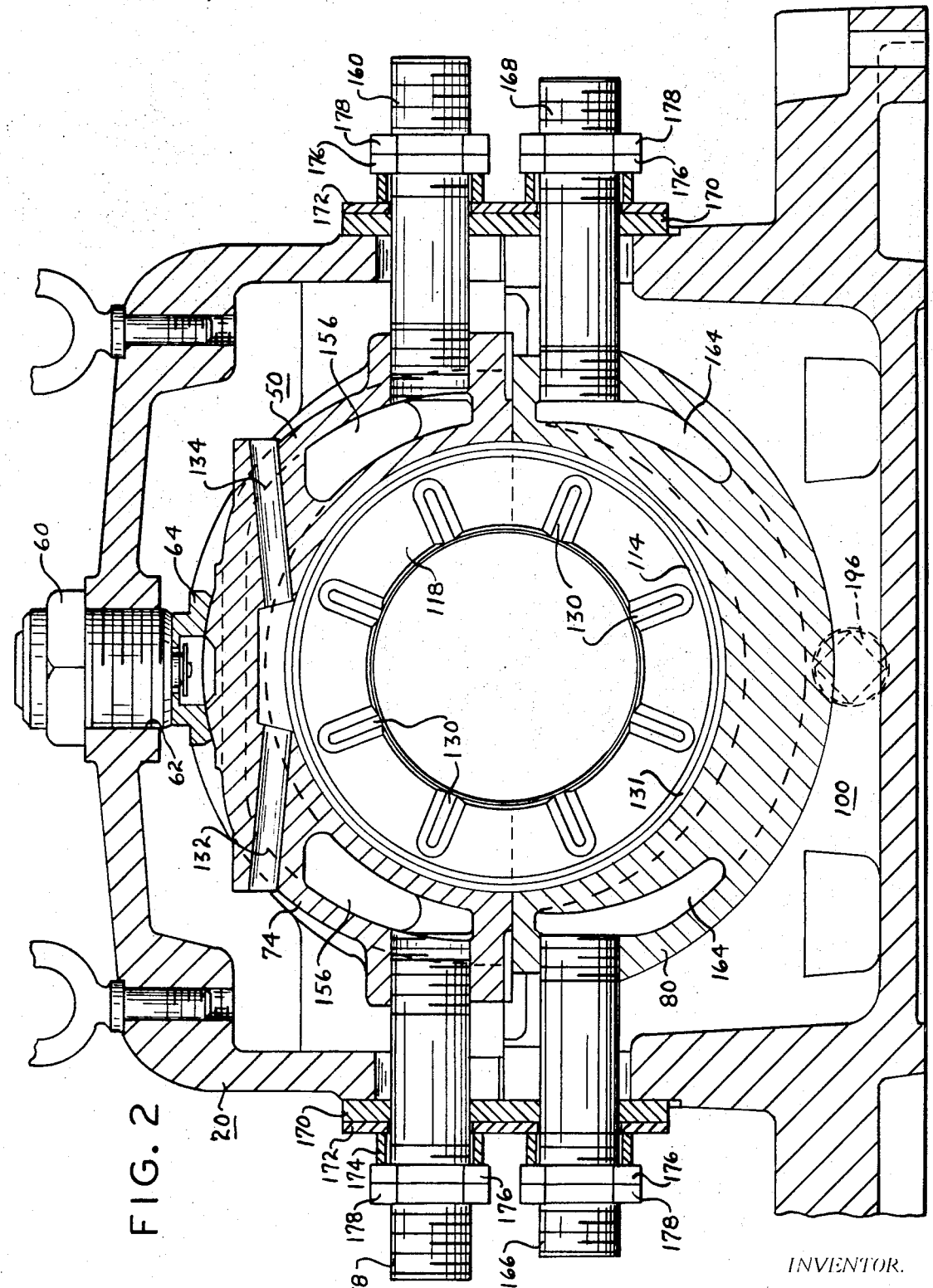
FIG. 2 is a vertical axial cross sectional view of the bearing structure shown in FIG. 1, the section being taken on line 2—2 of FIG. 1.

The two thrust plates 116 and 118 contain a plurality of recesses 130 equally spaced around the inner surface of the two plates and projecting generally radially from the inner edge of the plates to a point in relatively close proximity to the peripheral edge of the plates. The shape of the recess is illustrated most effectively in FIGS. 2 and 3, the latter figure showing the axial shape and approximate depth of the recesses relative to the thrust plate thickness. These recesses form radial pockets for the lubricant which flows from the inner ends of sleeves 70 and 76 and sleeves 72 and 78 onto the respective surfaces of thrust plates 116 and 118 and into the pockets, and is thereafter constantly distributed onto the thrust bearing surfaces.

In view of the centrifugal force, the lubricant entering the space between collar 120 and the two thrust plates tends to flow to the periphery of the collar and is thrown therefrom to annular space 131 around the periphery of the collar. The lower part of annular space 131 forms in effect a sump for the lubricant so that the lower part of the collar is constantly immersed in the lubricant when the bearing is idle. Upon operation of the bearing, the lubricant in the sump is carried upwardly between the collar and the two thrust plates, effectively lubricating the thrust bearings. Since the bearing surfaces between the collar and the two thrust plates are constantly supplied with the lubricant flowing from the inner edges of the adjacent sleeve bearings, the lubricant tends to accumulate in annular space 131. In order to prevent an excessive accumulation in the thrust bearing assembly, lubricant outlet channels 132 and 134 connect annular space 131 with the chamber surrounding liner 50, and as the lubricant is discharged from channels 132 and 134, it flows or drops downwardly into reservoir 100 for recirculation through the two bearings in the manner described hereinabove.

Since the collar, which is rigidly mounted on and secured to shaft 12, fits relatively snugly in the annular channel 150 defined by thrust plates 116 and 118, the two thrust plates absorb the thrust forces in both directions without permitting any significant end play in the shaft. The size of channel 150 may be relatively small consistent with sufficient strength in collar 120 to transmit the thrust forces from the shaft to the two thrust plates. It is thus seen that the collar and the two thrust plates form a compact thrust bearing structure in combination with the radial bearing structures, thus permitting a reduction in the overall axial width of the bearing housing and collar structure. While the thrust bearing assembly is shown located in the center of liner 50, it may be positioned laterally within the liner in either direction from the center.

Since the present bearing structure is designed primarily for use in high temperature operations, the bearing is water cooled. The cooling structure shown, including water chambers 154 and 156 in upper section 74, is connected to water supply and drain conduits 158 and 160. The coolant may flow in either direction through the chambers and the flow may be reversed through the two conduits. The lower section 80 of the liner includes two lubricant chambers 162 and 164 connected to conduits 166 and 168. The four conduits pass through the external wall of the bearing housing, and each is sealed therein by a gasket 170, washer 172, spacer 174 and nuts 176 and 178 threadedly received on the respective conduit.

The lubricant reservoir 100 is filled through openings 180 and 182 in the top of section 40 and these two openings are sealed by closures 184 and 186 secured to the section over the openings by a plurality of screws 188. These two holes may be used to inspect the condition and adjustment of the liner and other internal bearings parts and the condition of the lubricant after the bearing structure has been fully assembled. The lubricant is drained from reservoir 100 through openings 190 and 192 normally closed by plugs 194 and 196, respectively.

In the installation and operation of the present bearing, shaft 12 is installed while section 40 is removed from section 42. The shaft containing collar 120 is placed on sleeves 76 and 78, and collar 120 is seated in the lower part of channel 150. The two ends of shaft 12 project through openings 26 and 28 and the two seals 32 and 34 are mounted on the shaft. With the shaft, collar and seals in the foregoing position, the upper sections of liner 50 and housing 40 are secured in place, and the plunger assembly is tightened downwardly to retain the liner in its assembled and properly aligned position. During rotation of the shaft, the lubricant is lifted from reservoir 100 by rings 94 and 96, and deposited on the shaft adjacent openings 90 and 92. The lubricant then flows downwardly and laterally on the inner surfaces of sleeves 70, 72, 76 and 78, and from the inner ends of the two sleeves onto the two thrust plates 116 and 118. The lubricant then flows on the surfaces of the thrust plates and into recesses 130 where it effectively lubricates the thrust plates and the adjacent surfaces of the collar 120.

The radial and thrust bearing combination concept disclosed in the present application is intended primarily for use with the type of bearing shown in the drawings; however, the concept may be used advantageously in other types of bearings with or without an oil reservoir, and with and without a cooling system. The term body as used herein and in the claims refers to the liner, but also applies to any bearing structure which directly supports or defines the radial and thrust bearings.

While only one embodiment of the present bearing structure has been described in detail herein, various changes and modifications may be made without departing from the scope of the invention.

I claim:

1. A combination thrust and radial bearing structure for a shaft having an annular collar thereon, comprising a body member having a cylindrical bore with an annular channel in the wall thereof spaced inwardly from the bore ends for receiving the shaft and collar, the surfaces defining the side walls of said channel being generally radially arranged and forming opposed thrust bearing surfaces for adjacent surfaces of said collar, the lower part of said channel forming a lubrication sump with the sole access thereto being the area between the bearing surfaces of said side walls and each adjacent bearing surface of said collar.

2. A bearing structure as defined in claim 1 in which sleeves in said cylindrical bore form the said radial bearing and annular thrust plates form the side walls of said channel.

3. A bearing structure as defined in claim 2 in which said annular channel is substantially rectangular in cross section.

4. A bearing structure as defined in claim 1 in which said annular channel is in substantially the longitudinal center of said cylindrical bore.

5. A bearing structure as defined in claim 1 in which said body constitutes a liner, and a housing surrounds said liner in generally spaced relation thereto.

6. A bearing structure as defined in claim 5 in which a lubricant reservoir is formed in the lower part of said housing.

7. A bearing structure as defined in claim 6 in which an oil ring extends around the cylindrical bore on either side of the groove for contact with a shaft in said bore and being so positioned as to dip into the lubricant in said reservoir.

8. A bearing structure as defined in claim 1 in which drain passages communicating with said channel near the upper portion thereof are provided in said body.

9. A bearing structure as defined in claim 1 in which said thrust surfaces contain radially extending oil receiving recesses.

10. A bearing structure as defined in claim 2 in which the surfaces of said thrust plates contain radially extending oil receiving recesses.

11. A bearing structure as defined in claim 8 in which the surfaces of said thrust plates contain radially extending oil receiving recesses.

12. A bearing structure as defined in claim 1 in which said body is in two axial sections with the planes of the surfaces between the two sections passing substantially through the center of said cylindrical bore, and means secures said sections together.

13. A bearing structure as defined in claim 8 in which said body is in two axial sections with the planes of the surfaces between the two sections passing substantially through the center of said cylindrical bore, and means secures said sections together.

References Cited

UNITED STATES PATENTS

| 1,591,361 | 7/1926 | Church | 308—168 |
| 1,712,277 | 5/1929 | McIntyre | 308—160 |
| 1,900,924 | 3/1933 | Firth | 308—160 |

FOREIGN PATENTS

| 287,584 | 8/1931 | Italy | 308—168 |
| 319,066 | 4/1918 | Germany | 308—160 |

FRED C. MATTERN, Jr., Primary Examiner

F. SUSKO, Assistant Examiner

UNITED STATES PATENT OFFICE
CERTIFICATE OF CORRECTION

Patent No. 3,544,179           Dated December 1, 1970

Inventor(s) Robert P. De Leu

It is certified that error appears in the above-identified patent and that said Letters Patent are hereby corrected as shown below:

In the heading to the printed specification, lines 3 to 5, "Reliance Electric and Engineering Company, Euclid, Ohio, a corporation of Ohio" should read -- Reliance Electric Company, Euclid, Ohio, a corporation of Delaware --.

Signed and sealed this 14th day of September 1971.

(SEAL)
Attest:

EDWARD M. FLETCHER, JR.
Attesting Officer

ROBERT GOTTSCHALK
Acting Commissioner of Pat